United States Patent [19]

Baresel

[11] 4,194,471
[45] Mar. 25, 1980

[54] INTERNAL COMBUSTION ENGINE EXHAUST GAS MONITORING SYSTEM

[75] Inventor: Detlef Baresel, Stuttgart, Fed. Rep. of Germany

[73] Assignee: Robert Bosch GmbH, Stuttgart, Fed. Rep. of Germany

[21] Appl. No.: 882,177

[22] Filed: Feb. 28, 1978

[30] Foreign Application Priority Data

Mar. 3, 1977 [DE] Fed. Rep. of Germany ....... 2709215

[51] Int. Cl.² .............................................. F02B 75/10
[52] U.S. Cl. .......................... 123/119 EC; 123/32 EE
[58] Field of Search ....... 123/119 EC, 119 D, 32 EA, 123/32 R, 32 AE, 119 R, 140 C, 32 EE, 119 E; 60/276, 285, 39.28 T; 204/195 S

[56] References Cited

U.S. PATENT DOCUMENTS

| | | | |
|---|---|---|---|
| 3,745,768 | 7/1973 | Zechnall et al. | 123/32 EE |
| 3,759,232 | 9/1973 | Wahl et al. | 60/276 |
| 3,782,347 | 1/1974 | Schmidt et al. | 60/276 |
| 3,841,987 | 10/1974 | Friese et al. | 123/119 E |
| 3,926,154 | 12/1975 | Williams | 60/276 |
| 4,117,815 | 10/1978 | Ikevra | 60/276 |
| 4,127,088 | 11/1978 | Ezoe | 60/276 |

*Primary Examiner*—Charles J. Myhre
*Assistant Examiner*—R. A. Nelli
*Attorney, Agent, or Firm*—Frishauf, Holtz, Goodman & Woodward

[57] ABSTRACT

To detect substantial deviation of operation of the engine with fuel-air mixtures from stoichiometric relationships, particularly extended operation under very lean or enriched supply mixtures, the exhaust gases are conducted past a first sensor which provides a clearly defined voltage jump upon change of the exhaust gases between reducing and oxidizing state; and, additionally, to a second exhaust gas sensor and preferably to a third sensor, the second and third sensors being, respectively, responsive to the oxygen level in the exhaust gases and to the CO (or hydrocarbon) level in the exhaust gases, respectively, and additionally modifying the relative proportion of fuel and air of the mixture being fed to the engine.

21 Claims, 1 Drawing Figure

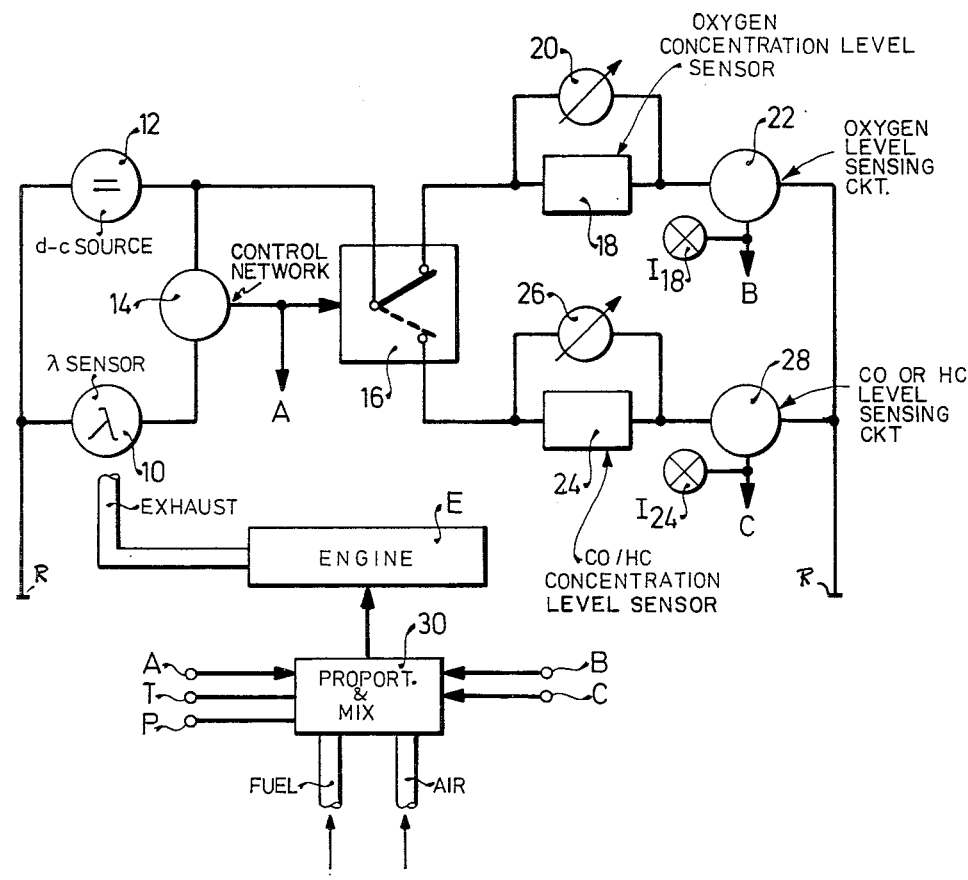

INTERNAL COMBUSTION ENGINE EXHAUST GAS MONITORING SYSTEM

Cross reference to related patents:
U.S. Pat. Nos. 4,021,326, issued May 3, 1977, Pollner et al, 3,841,987, Friese et al; 3,782,347 Schmidt et al. and 3,759,232 Wahl et al., 3,483,851, Reichardt, all assigned to the assignee of the present application.

The present invention relates to a monitoring system for the exhaust gases of an internal combustion engine, and more particularly to a system which utilizes a $\lambda$ sensor in which the output voltage provides a sudden jump if the composition of the exhaust gases changes between reducing and oxidizing state.

BACKGROUND AND PRIOR ART

Various types of monitoring systems to supervise the composition of exhaust gases in internal combustion engines have previously been proposed; such circuits, generally, provide an output signal which indicates whether the internal combustion engine is operating with a fuel and air supply which is either lean, that is, with a fuel-air ratio of greater than stoichiometric ($\lambda > 1$), or rich ($\lambda < 1$). This output signal can also be utilized to control the relative proportion of fuel and air being supplied to the internal combustion engine so that it will have the desired proportion and come as close to stoichiometric levels as possible. Reference is made to U.S. Pat. Nos. 4,021,326 and 3,841,987, Friese et al, for example, for a sensor of this type; and to U.S. Pat. Nos. 3,782,347, Schmidt et al. and 3,759,232, Wahl et al. all assigned to the assignee of the present application, for control systems suitable for use therewith. These, and other control and monitoring systems have the advantage that they rapidly react to changes in the composition of the exhaust gases. The $\lambda$-sensors which are based on oxygen ion concentration bodies with solid electrolytes react rapidly to changes in the composition of the exhaust gases. Their output signal changes essentially instantaneously between discrete values upon change in the composition of the exhaust gases between reducing and oxidizing state. When the concentration of oxygen drops or, respectively, the partial pressure of the oxygen drops to approximately zero, a characteristic voltage jump is obtained which can be readily evaluated in an electronic control circuit; see, for example, the aforementioned U.S. Pat. No. 3,759,232. The $\lambda$-sensors, however, are not suited to provide a signal which is readily evaluated and representative of oxygen partial pressure. Basically, this type of sensor is primarily useful to prevent operation of the engine with a mixture which is too rich, that is, at a $\lambda$ of less than unity. If the operating conditions of the engine are so set, or the design of the engine is such that it should be operated with a mixture which is relatively lean, that is, with a mixture in which there is an excess of oxygen present with respect to the stoichiometric proportion, then the exact value of the excess oxygen cannot be sensed by the type of $\lambda$-sensor employed in the aforementioned control systems and a lean fuel-air mixture cannot be controlled by such a sensor by controlling the relative proportion of fuel and air being supplied to the engine.

THE INVENTION

It is an object to provide an improved monitoring or supervisory or control system which permits supervision and monitoring of fuel-air mixtures which are lean, or rich and particularly to prevent a change in the composition of the mixture to such an excess, or shortage, respectively, of air that the operation of the engine is impaired.

Briefly, in accordance with the invention, besides the $\lambda$ sensor a second sensor is utilized, exposed to the exhaust gases which respond to the concentration of oxygen in the exhaust gases. This second sensor is of a type such that its conductivity changes proportionally i.e., in an analog manner to the oxygen concentration in the exhaust gases. A control circuit, controlled by the conductivity of the second sensor, is then provided to furnish output signals which can be either utilized as warning signals that the mixture is becoming too lean, or can be used in a closed loop with the proportioning and mixing device of fuel and air of the engine to regulate the fuel-air input to the engine back to its proper level.

In accordance with a preferred feature of the invention, a third sensor is used which has a conductivity proportional i.e., in an analog manner to concentration of gases in the exhaust of the engine which are present when the engine operates in the rich fuel-air range; such sensors may be responsive to carbon monoxide (CO) or to the presence of unburned hydrocarbon (HC) compounds. The conductivity of the third sensor, likewise, can be utilized to generate warning signals or control signals which are used to control the proportioning and mixing device of the engine.

A system using only the $\lambda$-sensor and an additional second oxygen concentration sensor has the advantage that application of a fuel-air mixture to the engine which is too rich can be sensed rapidly since the $\lambda$-sensor will provide an output signal indicative of transition to lack of oxygen in the exhaust system of the engine. This signal will be practically instantaneously available as soon as the mixture changes to the rich, that is, reducing range. Immediate sensing can result in rapid control action. The second sensor which is responsive to the oxygen concentration can be used to provide an upper limit for the excess oxygen. Sensors of this type have some time lag and do not respond as rapidly, practically instantaneously, as $\lambda$-sensors. Such sensors can be used, however, although responding relatively slowly, to provide control signals to the proportioning and mixing device to reestablish proper or design relationships between fuel and air being supplied to the engine.

Use of a third sensor which senses CO and/or HC compounds additionally permits generation of a warning or control signal that the $\lambda$-sensor is no longer operating properly since, normally, the $\lambda$-sensor should prevent operation of the engine with a rich mixture. The third sensor can, additionally, be used with an appropriate control circuit to generate control signals which are desired under certain conditions and which control excess fuel. Typical operating conditions are cold starting, when the engine should receive a mixture having an excess of fuel. The third sensor can then control the relative proportion of such a rich mixture, that is, to control the fuel excess being supplied in the mixture to the engine.

The second and third sensors can be associated with a common control circuit; it is also possible to associate the sensors with separate circuits.

In accordance with a preferred feature, it is desirable to include a change-over switch between the first or $\lambda$-sensor, and the second and third sensor, respectively, to permit alternative connection of the second and third sensor, or entire disconnection of both the second and third sensor in such a manner that the second sensor is activated if the input to the internal combustion (IC) engine is lean, and the third sensor is activated when the input to the IC engine is rich. Such change-over switches then permit separation of control signals in a proportioning and mixing device to prevent mutual interference, or countervailing command signals from the respective sensors or their signal processing networks.

DRAWING

Illustrating a preferred example:

The single FIGURE is a block diagram of the system.

A first or $\lambda$-sensor 10, constructed in customary manner, in accordance to U.S. Pat. Nos. 4,021,326 and 3,841,987, and a solid electrolyte body therebetween, as well known. The $\lambda$-sensor 10 is biassed by a polarizing voltage derived from a d-c source 12. The output of sensor 12 is connected to a control network 14 e.g. as described in the referenced U.S. Pat No. 3,759,232, the output of which provides a signal A on the one hand and, on the other, controls the position of a change-over switch 16. The change-over switch 16, shown in a simple schematic mechanical form may, actually, be a switching system. The change-over switch 16, in the position shown, applies current from source 12 to a second sensor 18. Sensor 18 is an oxygen concentration sensor which responds to the level of concentration of oxygen in the exhaust gas from IC engine E. An indicator 20 is connected in parallel to sensor 18. Sensor 18 is additionally connected to a signal or control network 22, having an output signal B which is representative of the change of sensor 18 and can also provide a limit signal. The output from network 22 is, additionally, indicated on an indicator $I_{18}$, indicating the state of the sensor and, for example, that an oxygen condition at, or above the limit has been sensed 18.

Materials for the second sensor 18 which are suitable and preferred are combinations of the following, in which the first-named material is the basis for the sensor body and the second-named material is a doping material: $ZnO-Cr_2O_3$; $MgO-Co-O$; $ZnO-Al_2O_3$; $SnO_2-MgO$; $SnO_2-Nb_2O_5$.

If the output of $\lambda$-sensor 10, as evaluated by circuit 14, indicates that the mixture is rich, that is, $\lambda$ at a value of less than unity, switch 16 will be controlled to change over to the broken-line position. In the broken-line position, source 12 is connected to a third sensor 24 which is a sensor responsive to the level of concentration of gases in the exhaust from the IC engine indicative of a rich mixture, that is, of carbon monoxide or hydrocarbon compounds. Preferably, sensor 24 is a CO sensor, responding to the level of CO in the exhaust gases from engine E. A measuring instrument 26 is connected in parallel to sensor 24. Sensor 24 is connected to an evaluation or signal processing circuit 28, which provides output signals representative of the level of sensed CO or HC components in the exhaust and evaluate the signals to determine limits. It provides an output signal C, which can also be indicated at an indicator $I_{24}$. Materials suitable for sensor 24, when sensing CO, and in which the first-named material is the base, and the second the doping material, are: $SnO_2-MgO$, $SnO_2-Nb_2O_5$ and $Cr_2O_3-SnO_2$. The sensors 10, 18, 24 are positioned to be exposed to the exhaust gases from the engine E. The engine E is supplied with fuel and air which are furnished to a proportioning and mixing element 30, for example a carburetor or a fuel injection system. The proportioning and mixing element 30 receives the signals A, B, C, respectively, to control the relative proportion of fuel and air being applied to the engine so that this proportion will have a predetermined ratio. The proportioning and mixing element 30, additionally, can have inputs which are dependent on other operation or operating parameters of the engine, for example engine temperature, schematically indicated by input T, or yet other operating parameters which, for simplicity, have been lumped together at a single input P. One such parameter may, for example, be whether the engine is under starting conditions or running normally. If under starting conditions, for example, a signal can be impressed on terminal P which, if the temperature signal at terminal T simultaneously indicates a low temperature, can control the proportioning and mixing element 30 to provide a richer mixture to the engine than if the engine is running normally, and already has reached design operating temperature. A suitable system for element 30 is described in U.S. Pat. No. 3,483,851, REICHARDT, assigned to the assignee of this application.

Operation:

Let it be assumed that the engine initially operates with a rich mixture which becomes increasingly lean. When the oxygen concentration in the exhaust from engine E rises from a lower level of about zero to a $\lambda=1$, $\lambda$-sensor 10 at $\lambda=1$ will provide an output signal in form of a voltage jump indicative of presence of excess oxygen. This jump in output signal is evaluated in circuit 14 and causes switch 16 to change into the position shown in solid lines in the figure, that is, in the upper position. Current can flow from source 12 through the second sensor 18 into control circuit 22 and return through the reference electrode R which, in an automotive vehicle, will be chassis. The level of the current will depend on the oxygen concentration in the exhaust from the engine, since the resistance of the second sensor 18 will change in dependence on the oxygen concentration. The current flowing through the second sensor 18 can be indicated by indicator 20 which will provide an analog indication of the oxygen concentration. Circuit 22, which can be any suitable limit indicating, or threshold circuit, is then used to generate warning or control signals which can be taken off circuit 22 as signal B and additionally indicated at a warning indicator $I_{18}$, if the oxygen concentration exceeds a predetermined level. The warning signals obtained from circuit 22 can be used to indicate to an operator of the IC engine, particularly the driver of a vehicle in which the engine is installed, that the engine receives a fuel-air mixture which is too lean. Indicator $I_{18}$ may be an optical or acoustic indicator, for example. Indication that a mixture is too lean informs the operator that the operating limits of the IC engine may be reached to permit the operator to so control the engine that stopping thereof is prevented. Signals B from circuit 22 additionally can be used to indicate limits of oxygen presence and, if such a limit is exceeded, to control the proportioning and mixing device 30 to supply more fuel or less air to the mixture, so that the fuel-air mixture being supplied to IC engine E will be controlled to have a predetermined value, or at least to fall below a predetermined limit.

Combination of $\lambda$-sensor 10 with the second, oxygen level concentration sensor 18, thus first provides a signal from the $\lambda$-sensor 10 which indicates whether the engine operates with a mixture which is either on the rich or on the lean side; this signal can be used, when obtained from terminal A, to control a suitable control process in the proportioning and mixing device 30. The λ-sensor 10 responds rapidly and, generally, is highly reliable. Response is so fast that, for example, if proportioning and mixing device 30 is a fuel injection system, the proper amount of fuel can be applied by a fuel injection pump within a few milliseconds of the sensing of the exhaust composition. The second sensor 18 ensures that the mixture applied to the IC engine E will not reach a limit of lean proportion which is so far to the lean side of operation that proper functioning of the engine can no longer be ensured.

Operating reliability is additionally improved by utilizing the change-over switch 16 and a third sensor 24 which responds to CO concentration in the exhaust gases. The third sensor 24 is particularly important if the λ-sensor should fail for some reason, so that the mixture being applied to the IC engine E becomes too rich. Under these conditions, the third sensor will provide a suitable warning signal at the indicator $I_{24}$ connected to the output C of evaluation circuit 28. Such a warning signal is particularly important in installations or vehicles in which the exhaust gas is conducted to a catalytic exhaust gas converter, located behind or downstream from sensors 10, 18, 24. If a catalytic exhaust gas converter receives exhaust gases derived from a fuel-air input to the engine which is excessively rich for some time, then the danger will arise that the exhaust gas converter will be contaminated and permanently damaged by an excess of non-combusted fuel residue. The signal output C of the second evaluation circuit 28 can be used to obtain control signals which can limit the degree of fuel-air ratio in the rich side; additionally, however, the signal output C from the second evaluation circuit 38 can be used to obtain command signals which are desirable to set a richer mixture under certain operating conditions, for example under conditions of starting of the engine while the temperature of the engine is below certain predetermined limits, or substantially below design operating temperature.

The third sensor 24 can respond to any suitable component of the exhaust gas which is indicative of a rich mixture; it may respond to CO or to hydrocarbon compounds, that is, to the concentration of HC compounds in the exhaust gases from engine E. An HC compound sensor likewise can be used for the dual function of supervising a component of the exhaust gases to determine if the mixture being supplied thereto is excessively rich, and provide a warning signal; and, alternatively or additionally, to provide control signals for deliberately supplying a mixture to engine E which is rich under certain operating conditions.

Various changes and modifications may be made within the scope of the inventive concept.

If the above described sensors 18 or 24 are fast enough, they can regulate the running of the engine with such lean or rich mixture of air and fuel as desired.

I claim:

1. Exhaust gas monitoring system to supervise the composition of exhaust gases emitted from an internal combustion engine (E)
comprising the combination of
a first exhaust composition sensor (10) located in sensing relation with respect to the exhaust gas stream from the internal combustion engine and providing an output signal which changes between discrete values upon transition of the composition of the exhaust gases between reducing and oxidizing state;
and air-fuel ratio control means (30) connected to and controlled by the first sensor (10) and controlling the relative proportion of air and fuel applied to the engine (E),
with
a second exhaust composition sensor (18) located in sensing relation with respect to the exhaust gas stream from the internal combustion engine comprising a material having an electrical characteristic which changes in an analog manner as a function of the level of concentration of oxygen present in the exhaust gases;
and an oxygen level sensing circuit connected to and controlled by said second sensor (18) responsive to said change in the electrical characteristic and providing an oxygen level output signal (B) if said characteristic and hence the oxygen concentration level in the exhaust gases exceeds a predetermined limit.

2. System according to claim 1, wherein said electrical characteristic of the material of the second oxygen content sensor (18) is the electrical resistance thereof.

3. System according to claim 1, further including a third exhaust gas composition sensor (24) comprising a material having an electrical characteristic which changes as a function of the concentration of an unburned component of the exhaust gases, when in reducing state, and including one of: carbon monoxide; hydrocarbon compounds present in the exhaust gases; and
an unburned component level sensing circuit (28) connected to and controlled by said third sensor (24) responsive to said change in electrical characteristic and providing an unburned component level output signal (C) if said characteristic and hence the level of concentration of unburned components in the exhaust gases exceeds a predetermined limit.

4. System according to claim 3, wherein said electrical characteristic of said third sensor comprises resistance.

5. System according to claim 1, further including transfer switch means (16) controlled by the output from said first exhaust composition sensor (10) and selectively connecting the respective output signals of said second and third sensors (18, 24) to said air-fuel ratio control means (30).

6. System according to claim 3, wherein the material of the third sensor comprises at least one of the materials of the group consisting of $SnO_2$—MgO, $SnO_2$—$Nb_2O_5$, $Cr_2O_3$—$SnO_2$.

7. System according to claim 3, wherein said third sensor is responsive to carbon monoxide.

8. System according to claim 3, wherein said third sensor is responsive to hydrocarbon compounds.

9. System according to claim 3, wherein said unburned component level output signal (C) is connected to additionally control said air-fuel ratio control means (30) in a direction to lower the content of unburned components in the exhaust gases.

10. System according to claim 3, wherein said unburned component level output signal (C) comprises an alarm signal.

11. System according to claim 9, wherein said oxygen level output signal (B) is connected to additionally control said air-fuel ratio control means (30) in a direction to lower the oxygen content in the exhaust gases, to thereby cause said air-fuel ratio control means to control the relative proportion of fuel and air of the fuel-air mixture applied to the engine as a function of the oxygen level output signal (B) if the oxygen concentration level in the exhaust gases has exceeded a predetermined limit; as a function of the oxidizing or reducing characteristics of the exhaust gases in a transition range of the exhaust gases between oxidizing and reducing state; and as a function of the unburned component level output signal (C) if the level of concentration of unburned components in the exhaust gases exceeds a predetermined limit.

12. System according to claim 3, wherein said electrical characteristic of said third sensor (24) comprises resistance.

13. System according to claim 3, wherein the material of the third sensor comprises at least one of the materials of the group consisting of $SnO_2$—$MgO$, $SnO_2$—$Nb_2O_5$, $Cr_2O_3$—$SnO_2$.

14. System according to claim 3, wherein said third sensor is responsive to carbon monoxide.

15. System according to claim 3, wherein said third sensor is responsive to hydrocarbon compounds.

16. System according to claim 1, wherein said oxygen level output signal (B) is connected to said air-fuel ratio control means (30) to additionally control the ratio of air and fuel being applied to the engine (E) in a direction to lower the oxygen content of the exhaust gases.

17. System according to claim 1, wherein the material of the second sensor comprises at least one of the materials of the group consisting of: $ZnO$—$Cr_2O_3$, $MgO$—$CoO$, $ZnO$—$Al_2O_3$, $SnO_2$—$MgO$, $SnO_2$—$Nb_2O_5$.

18. System according to claim 1, wherein said oxygen level output signal (B) comprises an alarm signal.

19. Exhaust gas monitoring system to supervise the composition of exhaust gases emitted from an internal combustion engine (E)

comprising the combination of a first exhaust composition sensor (10) located in sensing relation with respect to the exhaust gas stream from the internal combustion engine and providing an output signal which changes between discrete values upon transition of the composition of the exhaust gases between reducing and oxidizing state;

and an air-fuel ratio control means (30) connected to and controlled by the first sensor and controlling the relative proportion of air and fuel applied to the engine (E), with a second exhaust composition sensor (18) located in sensing relation with respect to the exhaust gas stream from the internal combustion engine comprising a material having an electrical characteristic which changes in an analog manner as a function of the level of concentration of oxygen present in the exhaust gases;

and an oxygen level sensing circuit (22) connected to and controlled by said sensor (18) responsive to said change in the electrical characteristic and providing an oxygen level output signal, said oxygen level output signal being connected to and additionally controlling the air-fuel ratio control means (30) and additionally controlling the relative proportion of air and fuel applied to the engine.

20. System according to claim 19, further including a third exhaust gas composition sensor (24) comprising a material having an electrical characteristic which changes in an analog manner as a function of the concentration of an unburned component of the exhaust gases, when in reducing state, and including one of: carbon monoxide; hydrocarbon compounds present in the exhaust gases;

and an unburned component level sensing circuit (28) connected to and controlled by said third sensor (24) and responsive to change in electrical characteristic and providing an unburned component level output signal (C), said unburned component level output signal (C) being connected to and additionally controlling said air-fuel ratio control means to additionally control the relative proportion of air and fuel applied to the engine when the exhaust gases are in reducing state.

21. System according to claim 20, further including transfer switch means (16) controlled by the output of said first exhaust composition sensor (10) and selectively connecting the respective output signals of said second and third sensors to said air-fuel ratio control means (30).

* * * * *

UNITED STATES PATENT AND TRADEMARK OFFICE
CERTIFICATE OF CORRECTION

PATENT NO. : 4 194 471
DATED : March 25, 1980
INVENTOR(S) : Detlef BARESEL

It is certified that error appears in the above-identified patent and that said Letters Patent are hereby corrected as shown below:

Col. 3, line 37, delete "18"

Claim 5, line 1 (col. 6, line 43), change "claim 1" to --claim 3--.

Signed and Sealed this

Twenty-second Day of July 1980

[SEAL]

Attest:

SIDNEY A. DIAMOND

Attesting Officer

Commissioner of Patents and Trademarks